March 21, 1967 W. LANDOW 3,310,645

SOLDER POT SWITCH CONTROL

Filed Oct. 7, 1965

INVENTOR.
WALTER LANDOW
BY Andrus & Starke
Attorneys

United States Patent Office 3,310,645
Patented Mar. 21, 1967

3,310,645
SOLDER POT SWITCH CONTROL
Walter Landow, East Cleveland, Ohio, assignor, by mesne assignments, to A. O. Smith Corporation, Milwaukee, Wis., a corporation of New York
Filed Oct. 7, 1965, Ser. No. 493,738
3 Claims. (Cl. 200—124)

This invention relates to a solder pot type switch control and particularly to a thermally responsive overload control switch.

In motor control circuits and the like, overload relay units are often provided to respond to abnormal current conditions and to disconnect the motor before damaging thereof as a result of such abnormal current conditions. A highly satisfactory control employs heat sensitive solder pot devices which normally hold the circuit in a standby operative condition. The solder pot device for example may include a ratchet wheel rotatably carried by a shaft normally fixed against rotation within a soldered mass. A spring-loaded switch mechanism is coupled to the ratchet wheel and normally held closed. A heating element is connected in series with the load and in the presence of overload current the solder melts to release the ratchet mechanism and allows the switch to move to the disconnect position.

The present invention is particularly directed to a mounting means for the solder pot device and provides a firm reliable support of the device in the operating condition while permitting ready insertion and removal for assembly, replacement and the like.

Generally in accordance with the present invention, a U-shaped member is provided having a base to which a solder tube is secured. A ratchet wheel is mounted between the legs of the U-shaped member with the shaft projecting upwardly into the solder tube. The U-shaped member is formed of a highly resilient metal or the like such that the legs form a spring supporting means which are interconnected to adjacent walls by a suitable slot and projecting interconnection. The adjacent walls may be provided with cammed enlargements projecting inwardly on an inclined plane such that when the U-shaped member is forced into the opening the legs are forced inwardly on the cammed surface until a latching slot or notch is aligned with the projections at which time the legs will snap outwardly into locking engagement with the projections. When it is desired to release the members it is merely necessary to either insert the ends of the fingers or a suitable compressing tool into the opening to move the legs inwardly to compress them beyond the locking projections and force them outwardly through the insert opening.

The present invention provides a very simple and reliable means for mounting a solder pot device or the like in an overload contactor where compactness and minimizing of the number of parts is highly important.

The drawing furnished herewith illustrates the best mode presently contemplated of carrying out the invention.

Figure 1:
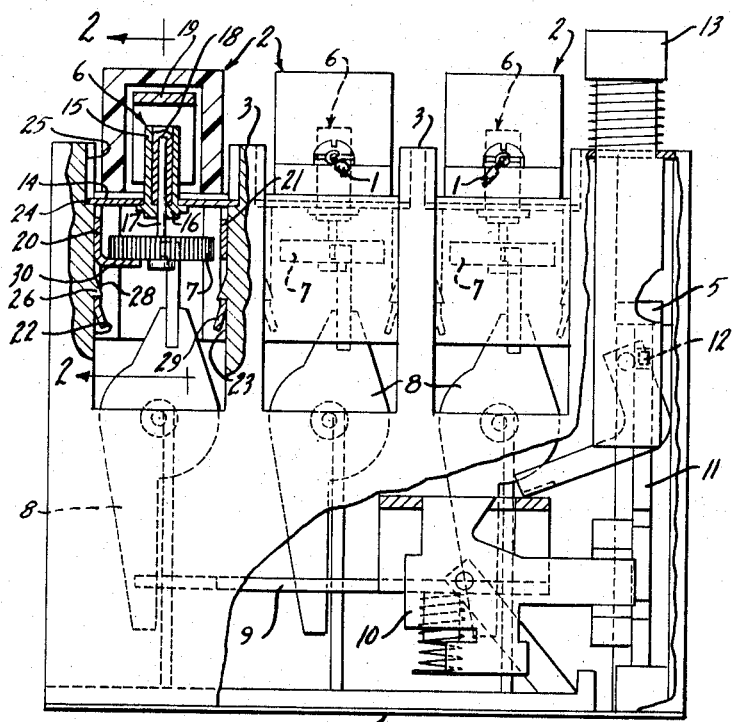
FIG. 1 is a side elevational view of a thermal overload device constructed in accordance with the present invention with parts broken away and sectioned to show certain details of construction of the solder pot device of the present invention.
Figure 3:
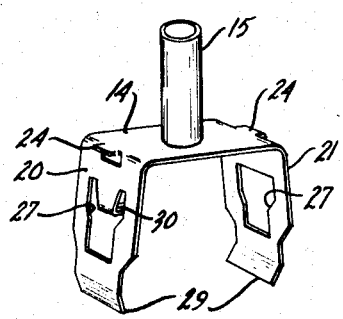
FIG. 3 is an enlarged perspective view of the solder pot unit shown in FIGS. 1 and 2.
Figure 2:
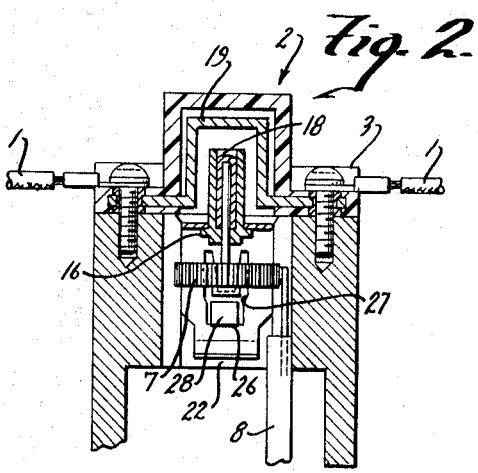
FIG. 2 is a cross sectional view taken on line 2—2 of FIG. 1.

Referring to the drawing and particularly to FIGS. 1 and 2, the illustrated embodiment of the invention is a thermal overload unit for controlling a three phase alternating current motor and the like, not shown, in response to the current flow in three input power lines 1 constituting the power lines to the motor. The illustrated overload unit is similar to that described in the copending application of Eduard W. Isler entitled Mechanical Reset Apparatus filed on even date herewith and assigned to a common assignee and generally includes three similar current sensitive sections 2, one section for each of the three power lines 1 which are broken and connected through the corresponding sections. Generally, the overload unit includes an upper housing 3 and a lower housing 4 releasably interconnected with a control switch 5 mounted to one end of the assembled housings 3 and 4. A solder pot assembly 6, particularly forming the subject of this application, is mounted in each of the sections 2 and generally includes a locking ratchet wheel 7 holding a pivotally mounted lever 8 in a standby position. A motion transfer plate 9 is slidably mounted within the housing sections 3 and 4 and is connected at one end to the levers 8 and terminates at the opposite end in a coupling and guide member 10 which is pivotally mounted for movement with plate 9. A switch operator 11 is slidably mounted within the housing 3 and connected to the coupling and guide member 10 and to a switch arm 12 of the adjacent switch 5 for opening and closing thereof in accordance with the positioning of member 10. Once tripped, the device must be manually reset through the use of a reset lever assembly 13 which is shown projecting downwardly through the top of the housing section 3 and coupled to the coupling and guide member 10 for moving of the guide member 10 and the switch operator 11 only in the direction of plate 9. The guide member 10 moves perpendicularly to the plate when assembly 13 is released.

For a more detailed description of the trip and reset mechanism and its operation reference may be made to the above identified copending application. The operation of the device is herein briefly described. The ratchet wheel 7 holds the lever 8 in a standby position with the coupling member 10 located to maintain the switch 12 in an operative position whereby power flows through the lines 1 to the motor or the like, not shown. If for any reason an abnormal current condition is created, the solder pot assembly 6 responds to the heating effect of the increasing current to release the ratchet wheel 7. Consequently, the spring loaded levers 8 rotate to the tripped position moving the switch plate 9. The coupling member 10 pivots to reposition the switch operator 11 and actuate the switch 5 of the control circuit.

More particularly, the illustrated solder pot assembly 6 includes a U-shaped clip member 14 formed of a suitable strip of spring steel. A solder tube 15 is secured within an opening in the base of the member 14 with a suitable bearing 16 disposed immediately inwardly of the inner surface of the base. A ratchet wheel shaft 17 projects upwardly through the tube 15 and is releasably held therein by solder 18 or the like. A U-shaped heating element 19 is secured overlying the solder pot assembly and connected to end lead terminals to lines 1 to provide a heat source for melting of the solder in the presence of abnormal current conditions in the lines 1 to release the ratchet wheel shaft 17 and the attached ratchet. The connection to lines 1 are shown in a simple screw type connection whereas in actual practice separate terminals, such as shown in the copending application of E. W. Isler entitled, Space Saving Electrical Terminal, and filed on Feb. 11, 1965, with Serial No. 431,796, are preferably employed.

The member 14 has parallel side arms 20 and 21 projecting from opposite edges of the base and corresponding to guide recesses or channels 22 and 23 formed in, and generally extending the complete length of, the opposite parallel walls defining a chamber within section 2 which is open at the opposite ends. The U-shaped member 14 is disposed within the section or chamber with the side arms 20 and 21 sliding within the channels. The inward movement is controlled by small tabs 24 projecting beyond the side arms from the base of member 14 into second recesses 25 formed within the recesses 22 and 23. The second recesses 25 terminate within the first recesses and define positioning ledges for limiting the inward insertion of the clip member. The illustrated tabs 24 are formed by striking out a small portion of the side arms 20 and 21 during the forming process.

The walls defining channels 22 and 23 include inwardly projecting locking protrusions 26 adapted to mate with corresponding locking openings 27 in the side arms 20 and 21 of the U-shaped member 14. Each of the protrusions is formed to define an inclined cam surface 28 which extends from the wall of the corresponding channel downwardly and inwardly within the section chamber. The protrusions 26 are aligned and similarly project inwardly from the corresponding wall of the channels. Thus, when the arms 20 and 21 move into the corresponding channel, the innermost ends engage the cam surface 28. As the unit is pushed inwardly the arms 20 and 21 are forced or cammed inwardly about the connection to the base over the protrusions 25 until the locking openings 26 are aligned with the protrusions. The spring force of the arms 20 and 21 then causes them to pivot rapidly outwardly into engagement with the adjacent walls. Generally, the outer end edge of the opening is aligned with the clamping wall defined by the projection 26 with the tab 24 engaging the positioning ledge defined by the recess 25 and provides a firm interlock of the U-shaped clip members and consequently, the ratchet assembly within the switch housing 3.

The innermost ends of the side arms 20 and 21 terminate in oppositely bent lips 29 which project angularly toward each other such that an inward or lateral force on each lip also creates a slight normal force to assist in removing of the device from the housing 3. The lips 29 also serve as a guide to slightly compress the arms 20 and 21, which may be normally resiliently urged outwardly from the parallel arrangement of the side walls, as the clip is inserted between the walls. The lips 29 are located in slightly spaced relation to the innermost end of the compartment in the assembled relation to permit access from the underside of housing 3. To remove the solder pot device, the two-piece housing is disassembled to provide access to the innermost ends of arms 20 and 21 through the opening of section 2. The fingers, or a suitable tool, are inserted into the opening of section 2 and engage the guide lips 29 to compress the side arms 20 and 21. The inclined guide lips 29 cause the U-shaped member 14 to pop outwardly of the opening as soon as the arms 20 and 21 are compressed to disengage protrusions 25 and locking openings 26.

In the illustrated embodiment of the invention, the opening 27 in the arm 20 includes an L-shaped struck out portion defining an inwardly projecting ledge 30 disposed beneath the ratchet wheel 7, which serves as a control element with respect to the actuation of the lever 8.

When the solder 18 melts, the ledge serves to support the wheel 7 for removal with the clip 14 as a complete assembly 6.

The present invention thus provides a very simple and reliable locking means for a switch control or the like.

Various modes of carrying out the invention are contemplated as being within the scope of the following claims particularly pointing out and distinctly claiming the subject matter which is regarded as the invention.

I claim:

1. In a control assembly,
    a control element,
    a housing having a pair of spaced parallel walls defining a chamber open at opposite ends, each of said walls including an inwardly projecting locking protrusion on the inner wall surface, and
    a generally U-shaped support clip disposed in the chamber and having resilient side arms normally spaced outwardly in accordance with the spacing of the walls and resiliently engaging the parallel walls, said side arms having opening means complementing said locking protrusions and interengaging said protrusions to releasably lock the support clip within the housing, said side arms having the outer free ends terminating adjacent an open end of the chamber for access thereto and having means intermediate the length of one of said side arms extending inwardly for supporting the control element.

2. A replaceable control assembly, comprising
    a control element,
    a housing having spaced parallel planar walls defining a chamber opening at opposite ends of the walls, each of said walls having first aligned recesses extending the length of the walls and second parallel recesses within the first recesses, said second recesses extending from an input open end and terminating intermediate the length of the first recesses to define a positioning ledge, said walls including an aligned protrusion generally centrally of the first recesses and inwardly of said positioning ledge, each of said protrusions having an inclined wall extending inwardly from the input open end to a normal clamping wall, and
    a U-shaped clip formed of a resilient strip and having generally parallel side arms joined at one end by a lateral base corresponding to the spacing of said walls, said clip having a width corresponding to the width of the first recesses and mating therewith and having integral tabs oppositely projecting from the base into the second recesses to limit the inward movement of the clip, said arms having means intermediate the length of one of said side arms extending inwardly for supporting the control element and openings of a width corresponding to the protrusions and located to align end edge of the opening with the clamping wall of the protrusion with the tab engaging the positioning ledge, and
    the outer ends of the arms being bent inwardly to permit grasping thereof for compressing of the legs to disengage the protrusion for removal of the clip.

3. A heat sensitive replaceable control assembly, comprising
    a housing having spaced parallel planar walls and opening at opposite ends of the walls, each of said walls having first aligned recesses extending the length of the walls and second recesses within the first recesses, said second recesses extending from one end and terminating intermediate the length of the first recesses, said walls including an aligned protrusion centrally of the first recesses, each of said protrusions having an inclined wall extending inwardly from the end adjacent the second recess to an outwardly projecting clamping wall,
    a U-shaped clip formed of a spring steel strip and having parallel side arms and joined at one end by a lateral base corresponding to the spacing of said walls, said clip having a width corresponding to the width of the first recesses and mating therewith and having integral tabs oppositely projecting from the base into the second recesses to limit the inward movement of the clip, said arms having openings of a width of the protrusions and a greater length with the outer opening edge engaging the clamping wall of the protrusion, the outer ends of the arms being bent inwardly to permit grasping thereof for compressing of the arms to disengage the arms from the protrusions and forcing the clip outwardly through the opposite end of the opening in the housing, a tube secured to the base and projecting outwardly therefrom, a ratchet wheel having a shaft rotatably disposed within the tube, and a solid material filling the tube and holding the shaft against rotation, said material being disrupted by a selected temperature.

References Cited by the Examiner

UNITED STATES PATENTS

| | | | |
|---|---|---|---|
| 2,310,531 | 2/1943 | Kuhn et al. | 200—124 |
| 2,688,123 | 8/1954 | Benham et al. | 339—176 |
| 2,743,326 | 4/1956 | Matthias | 200—124 |
| 3,041,570 | 6/1962 | Simerl | 339—128 X |

BERNARD A. GILHEANY, *Primary Examiner.*

H. GILSON, *Assistant Examiner.*